United States Patent [19]

Lee

[11] Patent Number: 5,732,129
[45] Date of Patent: Mar. 24, 1998

[54] METHOD OF IMPROVING COMPUTER COMMUNICATION SPEED IN KEY TELEPHONE SYSTEM

[75] Inventor: Kie-Bok Lee, Seoul, Rep. of Korea

[73] Assignee: LG Electronics Inc., Seoul, Rep. of Korea

[21] Appl. No.: 815,588

[22] Filed: Mar. 12, 1997

[30] Foreign Application Priority Data

Mar. 12, 1996 [KR] Rep. of Korea ............. 1996-6489

[51] Int. Cl.⁶ .................................................. H04M 1/00
[52] U.S. Cl. ........................ 379/156; 379/165; 370/449
[58] Field of Search .................................. 379/112, 156, 379/157, 164, 165, 93.05, 93.33, 236, 413–419; 370/449, 450, 451, 456, 359, 419, 528; 395/200.67, 849, 867, 868, 869, 870, 733, 742

[56] References Cited

U.S. PATENT DOCUMENTS

| | | | |
|---|---|---|---|
| 4,650,932 | 3/1987 | Komuro et al. | 379/165 |
| 4,794,641 | 12/1988 | Kanno et al. | 379/165 |
| 4,821,316 | 4/1989 | Okumura et al. | 379/156 |
| 4,993,025 | 2/1991 | Vesel et al. | 370/450 |
| 5,142,565 | 8/1992 | Ruddle | 379/93.03 |
| 5,193,089 | 3/1993 | Tsuchida | 379/165 |
| 5,333,182 | 7/1994 | Aoki | 379/97 |
| 5,343,516 | 8/1994 | Callele et al. | 379/98 |
| 5,432,846 | 7/1995 | Norio | 379/266 |
| 5,572,572 | 11/1996 | Kawan et al. | 379/98 |
| 5,642,410 | 6/1997 | Walsh et al. | 379/201 |

*Primary Examiner*—Curtis Kuntz
*Assistant Examiner*—Rexford Barnie
*Attorney, Agent, or Firm*—Birch, Stewart, Kolasch & Birch, LLP

[57] ABSTRACT

A method of improving the speed of a computer communication interface module in a key telephone system is disclosed including the steps of: (a) detecting if control data transmission/reception interrupt occurs or not; (b) checking start flag in control data; (c) performing computer communication data polling at interval less than half of a control data processing clock; (d) receiving or transmitting one byte of computer data during the period of less than half of the clock, if there is an event of computer communication data after the polling; and (e) checking an end flag, finishing the process if there is an end flag, and carrying out processes repeatedly from step (c) if there is no end flag.

1 Claim, 2 Drawing Sheets

Control Data Clock
62.5μs

Polling

Computer Communication Data Clock

METHOD OF IMPROVING COMPUTER COMMUNICATION SPEED IN KEY TELEPHONE SYSTEM

BACKGROUND OF THE INVENTION

1. Field of the Invention

The present invention relates to a method of improving the speed of a computer communication interface in a terminal device of a key telephone system having main and terminal device.

2. Discussion of Related Art

In a key telephone system, the communication between main and terminal devices is performed in such a manner that a key code is transmitted from the terminal device to the main device, or a control instruction code is transmitted from the main device to the terminal device. A computer communication interface is included in the terminal device, that interfaces audio or data communication between the main device and a transceiver of the terminal device, and also interfaces data communication between the main device and a personal computer connected to the system through a separate RS232C line. By doing so, computer communication can be carried out through the main device connected to an external public telephone network.

A conventional key telephone system has a 8 kHz control data transmission/reception processing clock between its main device and key set. This standardized frequency has been used in the control data transmission/reception even through processors for computer communication have made rapid progress. A two-way communication for the control data transmission/reception conventionally needs 5 ms. The key telephone system having the main and terminal devices processes the control communication between them at the highest priority. A unit data communication is carried out at intervals of 25 ms.

When the control data communication is performed between the main and terminal devices, computer communication data from a computer or main device disappears during the transmission/reception since the control data transmission/reception has priority. Accordingly, the data transmission speed in the computer communication cannot exceed 1600 bps in a conventional key telephone system whose control data transmission/reception is performed at intervals of 20 ms during 5 ms of period.

SUMMARY OF THE INVENTION

Accordingly, the present invention is directed to a method of improving computer communication speed in a key telephone system that substantially obviates one or more of the problems due to limitations and disadvantages of the related art.

An objective of the present invention is to provide a method of improving data transmission speed of computer communication in a key telephone system while the communication between main and terminal devices of the system is smoothly performed.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a method of improving the speed of a computer communication interface module in a key telephone system includes the steps of: (a) detecting if control data transmission/reception interrupt occurs or not; (b) checking start flag in control data; (c) performing computer communication data polling at interval less than half of a control data processing clock; (d) receiving or transmitting one byte of computer data during the period of less than half of the clock, if there is an event of computer communication data after the polling; and (e) checking an end flag, finishing the process if there is an end flag, and carrying out processes repeatedly from step (c) if there is no end flag.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention:

DETAILED DESCRIPTION OF PREFERRED EMBODIMENT

Reference will now be made in detail to the preferred embodiments of the present invention, examples of which are illustrated in the accompanying drawings.

Figure 1:
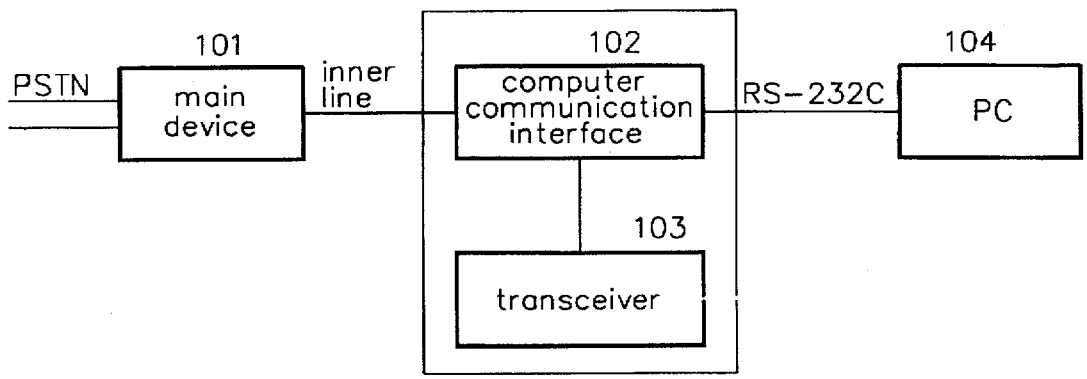
FIG. 1 is a block diagram of a computer communication interface in a general communication system.

FIG. 1 is a block diagram of a computer communication interface in a general communication system. Referring to FIG. 1, the general communication system includes a transceiver 103, connected to the system for communication responding to a control signal output from a main device 101, simultaneously, transmits/receives an event generated by a user to/from the main device, and a computer communication interface 102 connected to transceiver 103, for transmitting/receiving control data between main device 101 and transceiver 103, and for providing communication service between main device 101 and computer 104.

Figure 2:
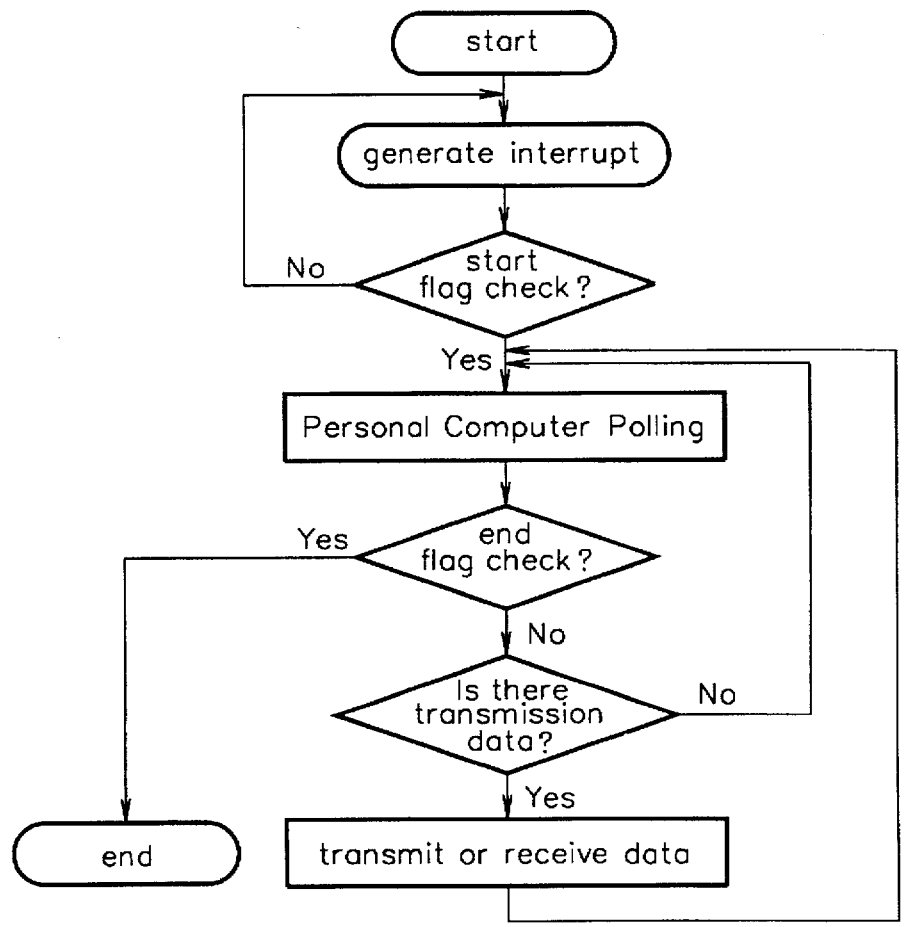
FIG. 2 is a flow chart showing a method of improving the speed of a computer communication interface module of a communication system according to the present invention.
Figure 3A:
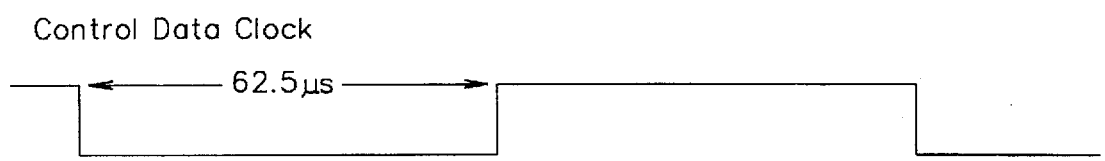
FIGS. 3A, 3B and 3C show a data clock, control data polling and a computer communication data clock, respectively.
Figure 3B:
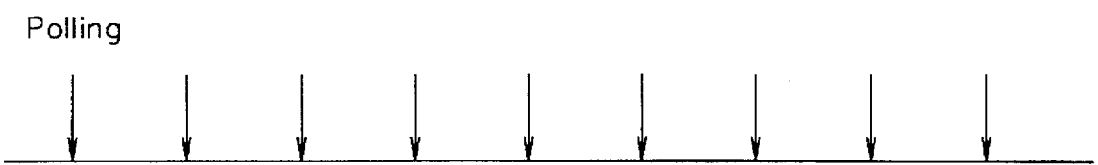
Figure 3C:

FIG. 2 is a flow chart showing a method of improving the speed of a computer communication interface module of a communication system according to the present invention. Referring to FIG. 2, if an interrupt occurs during a control data transmission/reception clock, the control data is checked for a start flag. The interrupt is checked again if there is no start flag. Personal computer polling is carried out at interval less than half of a control data processing clock when there is a start flag, After the personal computer polling, if end flag is not detected, transmission data is checked. If there is no transmission data, the personal computer polling is repeated. If there is transmission data, one byte of computer data is transmitted or received during the period of less than half of control data processing clock, and then personal computer polling is repeated. If the end flag is detected, the process is finished. FIG. 3A, FIG. 3B and FIG. 3C show a control data clock, control data polling and computer communication data clock, respectively.

As described above, the present invention performs the computer communication data polling when the computer communication interface interrupt occurs. This prevents data loss which is generated in case of speed-up of the communication. Furthermore, transmission/reception of two or more pieces of communication data can be performed simultaneously. As a result, the computer communication speed is improved.

It will be apparent to those skilled in the art that various modifications and variations can be made in the method of improving computer—communication speed in a key telephone system of the present invention without departing from the spirit or scope of the invention. Thus, it is intended that the present invention cover the modifications and variations of this invention provided they come within the scope of the appended claims and their equivalents.

What is claimed is:

1. A method of improving the speed of a computer communication interface module in a key telephone system, the method comprising the steps of:

(a) detecting if control data transmission/reception interrupt occurs or not;

(b) checking start flag in control data;

(c) performing computer communication data polling at interval less than half of a control data processing clock;

(d) receiving or transmitting one byte of computer data during the period of less than half of the clock, if there is an event of computer communication data after the polling; and (e) checking an end flag, finishing the process if there is an end flag, and carrying out processes repeatedly flora step (c) if there is no end flag.

* * * * *